(12) United States Patent
Demyanov et al.

(10) Patent No.: US 12,125,129 B2
(45) Date of Patent: *Oct. 22, 2024

(54) FACIAL ANIMATION TRANSFER

(71) Applicant: Snap Inc., Santa Monica, CA (US)

(72) Inventors: Sergey Demyanov, Santa Monica, CA (US); Aleksei Podkin, Santa Monica, CA (US); Aliaksandr Siarohin, Santa Monica, CA (US); Aleksei Stoliar, Marina del Rey, CA (US); Sergey Tulyakov, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,470

(22) Filed: Apr. 19, 2023

(65) Prior Publication Data

US 2023/0252704 A1    Aug. 10, 2023

Related U.S. Application Data

(63) Continuation of application No. 17/303,537, filed on Jun. 1, 2021, now Pat. No. 11,645,798.

(60) Provisional application No. 63/032,858, filed on Jun. 1, 2020.

(51) Int. Cl.
  *G06T 13/00* (2011.01)
  *G06N 3/045* (2023.01)
  *G06N 3/08* (2023.01)
  *G06V 40/16* (2022.01)

(52) U.S. Cl.
  CPC ............ *G06T 13/00* (2013.01); *G06N 3/045* (2023.01); *G06N 3/08* (2013.01); *G06V 40/171* (2022.01); *G06V 40/174* (2022.01)

(58) Field of Classification Search
  CPC ..... G06T 13/00; G06T 13/40; G06T 2215/16; G06T 2207/30201; G06T 2207/10016; G06T 7/73; G06T 7/55; G06T 13/20; G06V 40/174; G06V 10/82; G06V 40/171; G06V 40/165; G06V 40/176; G06V 40/172; G06N 3/045; G06N 3/08; G06N 3/02
  See application file for complete search history.

(56) References Cited

U.S. PATENT DOCUMENTS

| 9,104,908 B1 * | 8/2015 | Rogers ................. G06V 40/176 |
| 9,799,096 B1 * | 10/2017 | De la Torre .......... A63F 13/655 |
| 2017/0213075 A1 * | 7/2017 | Whitehill .............. G06F 18/254 |

(Continued)

OTHER PUBLICATIONS

"U.S. Appl. No. 17/303,537, Notice of Allowance mailed Dec. 27, 2022", 12 pgs.

*Primary Examiner* — Xilin Guo
(74) *Attorney, Agent, or Firm* — Schwegman Lundberg & Woessner, P.A.

(57) ABSTRACT

Systems and methods are disclosed for generating, a source image sequence using an image sensor of the computing device, the source image sequence comprising a plurality of source images depicting a head and face, identifying driving image sequence data to modify face image feature data in the source image sequence, generating, using an image transformation neural network, a modified source image sequence comprising a plurality of modified source images depicting modified versions of the head and face, and storing the modified source image sequence on the computing device.

20 Claims, 11 Drawing Sheets

(56) References Cited

U.S. PATENT DOCUMENTS

2020/0234508 A1* 7/2020 Shaburov .............. G06V 40/174
2020/0286301 A1* 9/2020 Loper ....................... G06T 7/80

* cited by examiner (a) Facial Expression Matching (a) Head Pose Matching

FACIAL ANIMATION TRANSFER

CLAIM OF PRIORITY

This application is a continuation of U.S. application Ser. No. 17/303,537, filed Jun. 1, 2021, which claims the benefit of priority to U.S. Provisional Application Ser. No. 63/032,858, filed on Jun. 1, 2020, which applications are incorporated herein by reference in their entireties.

TECHNICAL FIELD

Embodiments of the present disclosure generally relate to facial animation. More particularly, but not by way of limitation, the present disclosure addresses systems and methods for facial animation transfer under a wide range of head poses and facial expressions.

BACKGROUND

Image annotation consists of generating a video sequence so that an object in a target image is animated according to the motion of a driving video. Specifically, facial animation consists of extracting motion patterns from a driving video containing another face showing a sequence of facial expressions and transferring the motion patterns to an image or several images to the target face.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

The present disclosure addresses facial animation transfer under a wide range of head poses and facial expressions. An expression matcher system generates a source image sequence depicting a head and a face. The expression matcher system identifies driving image sequence data to modify face image feature data in the source image sequence. For example, the driving image sequence data includes an ordered set of image arrays of a human actor, ordered based on a time stamp associated with each image array. The ordered set of image arrays depicts a head pose and an expression of the human actor. Each image array has images of the human actor from different viewpoints. The expression matcher system also identifies an expression dataset. The expression dataset is an unordered set of image arrays of the human actor with different facial expressions. Each image array in the expression dataset contains images of the same facial expression from different viewpoints.

The expression matcher system generates a modified source image sequence using an image transformation neural network. For example, the image transformation neural network is trained to receive the source image sequence as an input, and outputs a modified source image sequence depicting modified versions of the head and the face. The image transformation neural network uses an identified driving image from the driving image sequence data and an identified expression image from the expression dataset to generate the modified image sequence. The expression matcher system stores the modified source image sequence on the user device. Further details regarding the expression matcher system are described below in connection with FIG. 7.

Networked Computing Environment

Figure 1:
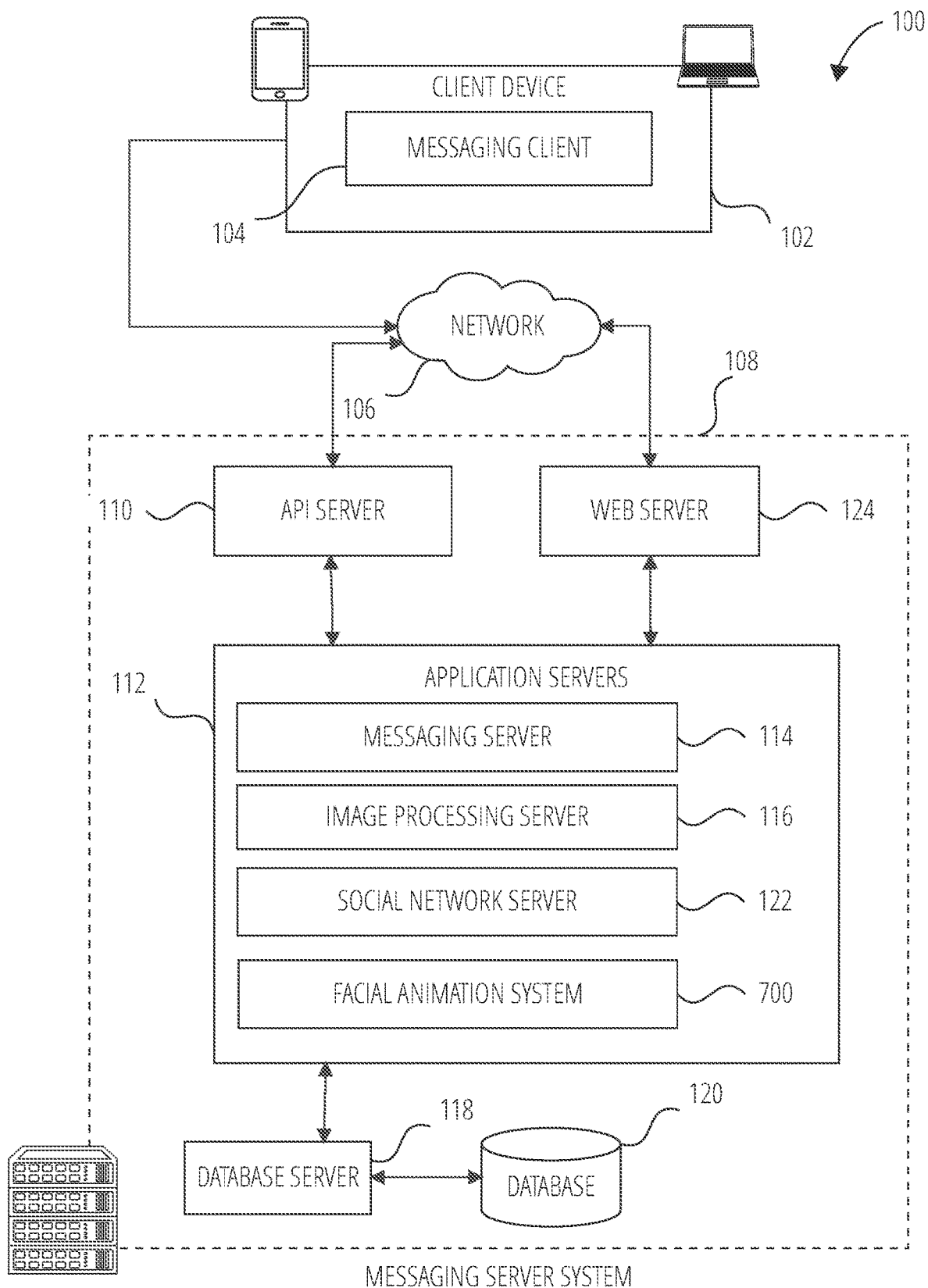
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
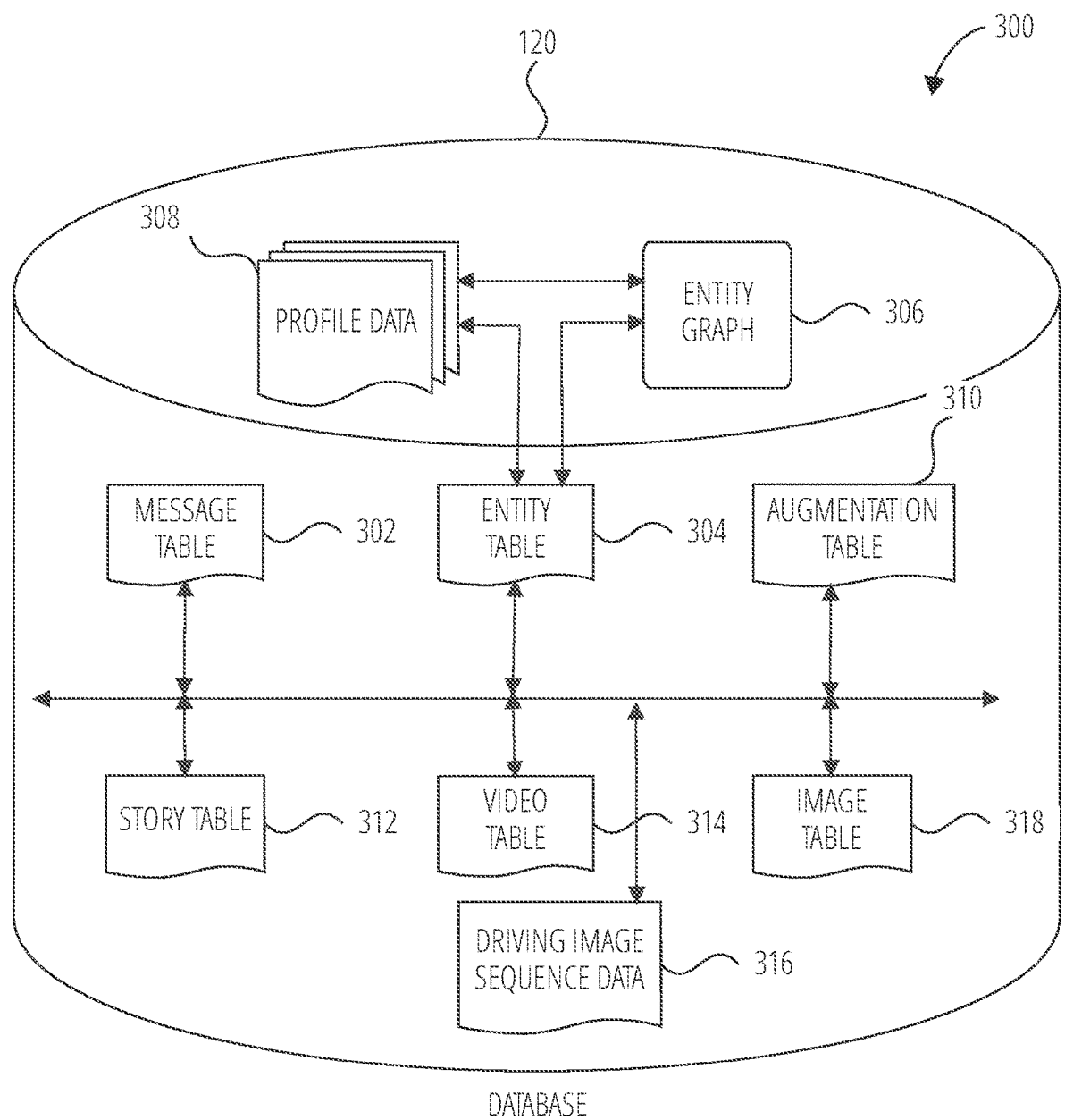
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

The facial animation system 700 provides facial animation functionality that modifies an image sequence depicting a head and a face using a neural network. The facial animation system 700 uses a neural network to match head poses and facial expressions from a driving object (e.g., driving image sequence data) to a target object (e.g., source image sequence data).

System Architecture

Figure 2:
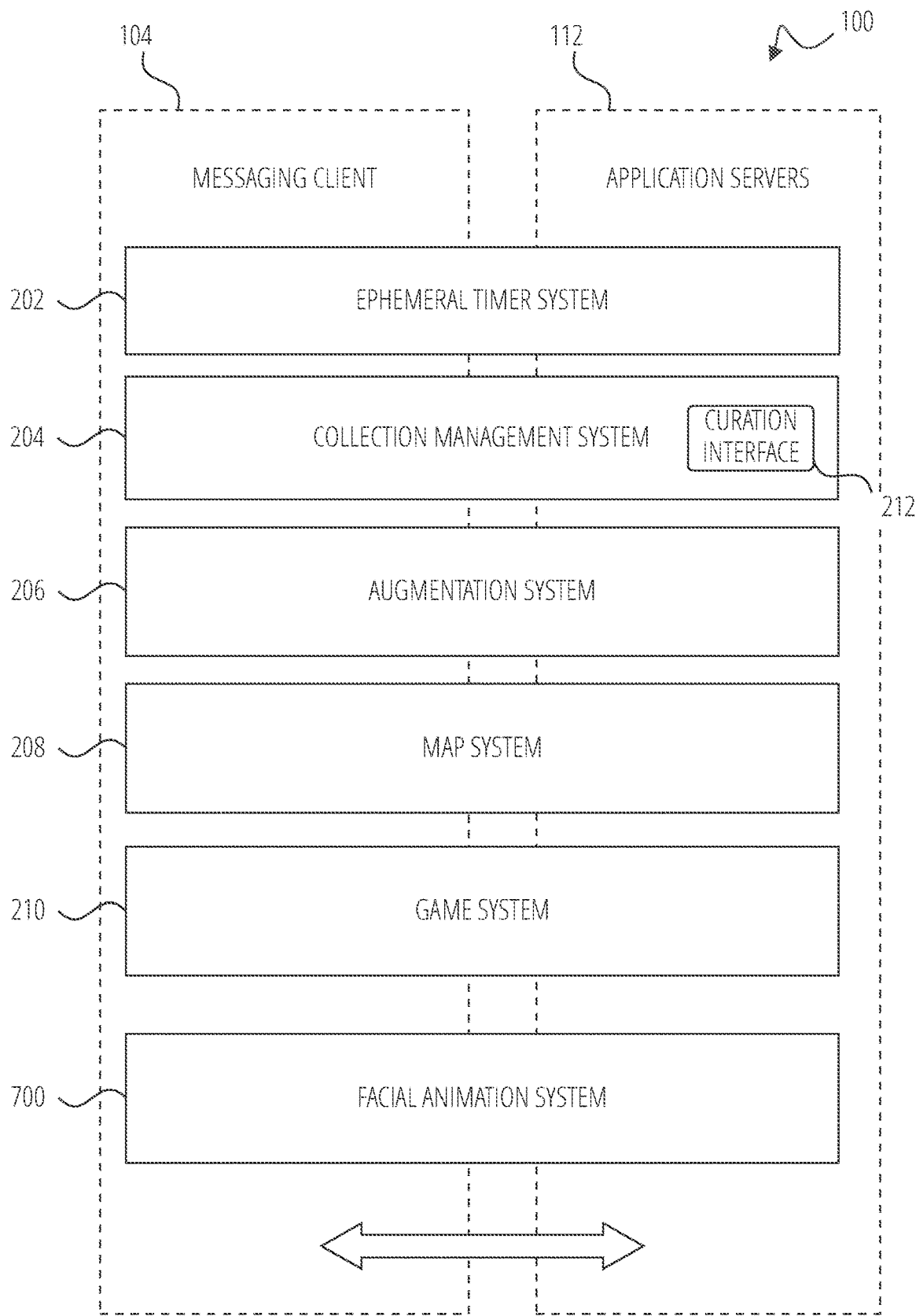
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, an augmentation system 206, a map system 208, a game system 210, and a facial animation system 700.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The facial animation system 700 provides facial animation functionality that modifies an image sequence depicting a head and a face using a neural network. The facial animation system 700 uses a neural network to match head poses and facial expressions from a driving object to a target object. In some examples the facial animation system 700 operates within the context of the messaging client 104. In some examples, the facial animation system 700 may be supported by the application servers 112.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 318).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 318 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 318 stores image data associated with messages for which message data is stored in the entity table 304. The entity table 304 may associate various augmentations from the augmentation table 310 with various images and videos stored in the image table 318 and the video table 314.

The database 120 can also store driving image sequence data within the driving image sequence data 316. For example, the driving image sequence data 316 can store a set of ordered images which includes head pose images of a head model depicted from different viewpoints. The driving image sequence data 316 may be captured using multiple image capture devices. The database 120 can also stores an expression dataset (not pictured). The expression dataset can store expression images that each depict a face in a different expression from different viewpoints.

Data Communications Architecture

Figure 4:
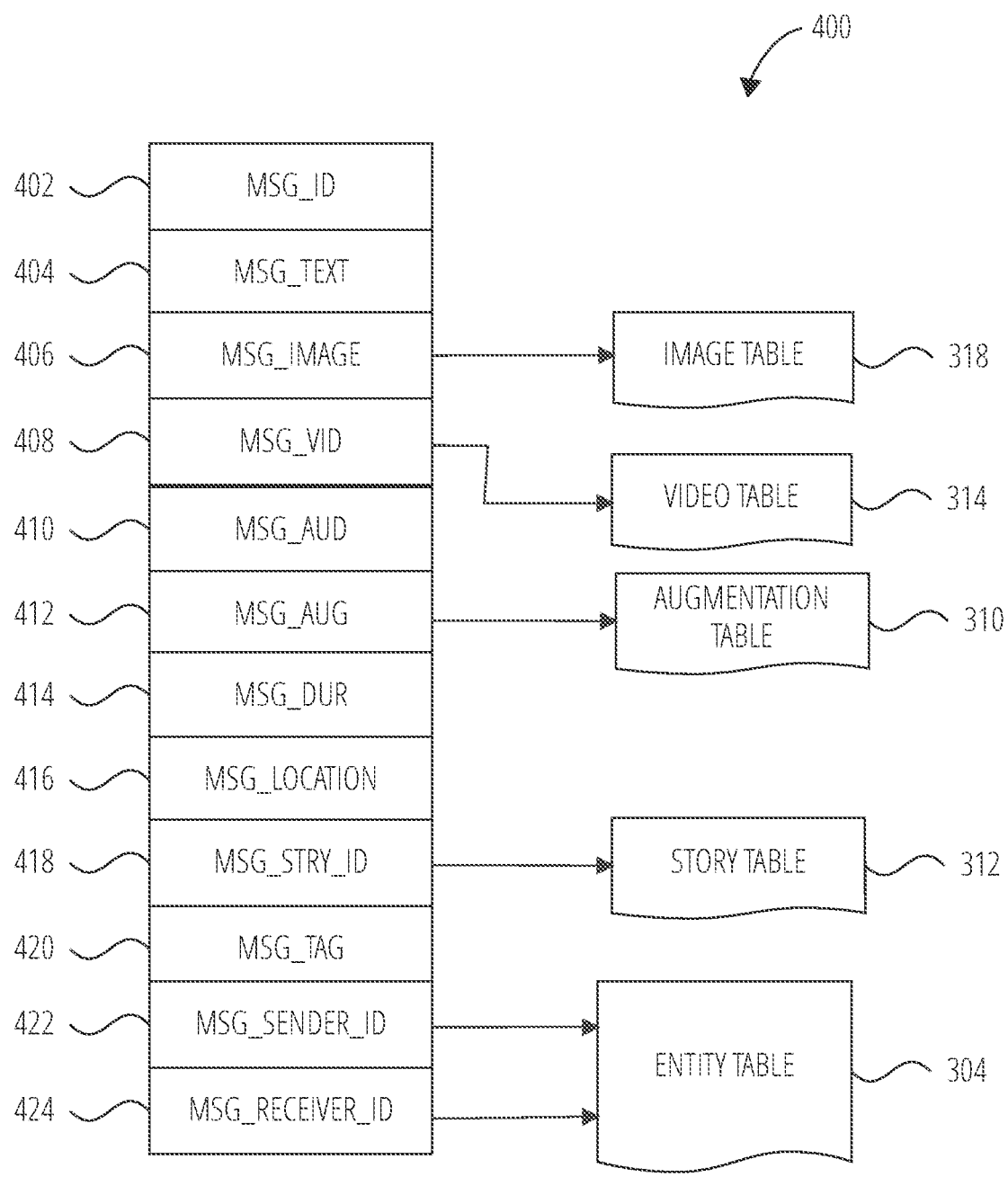
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 318.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 318. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
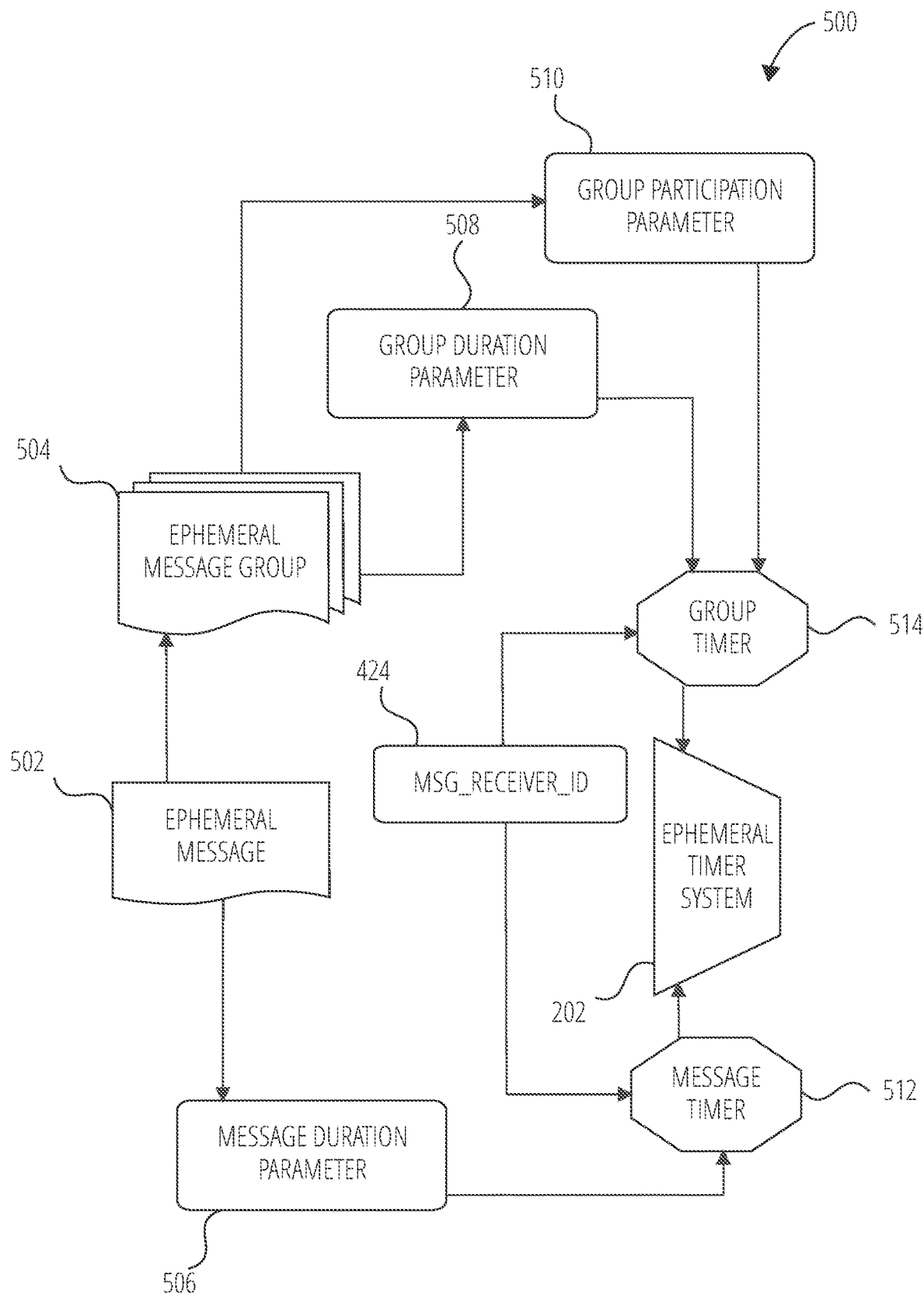
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
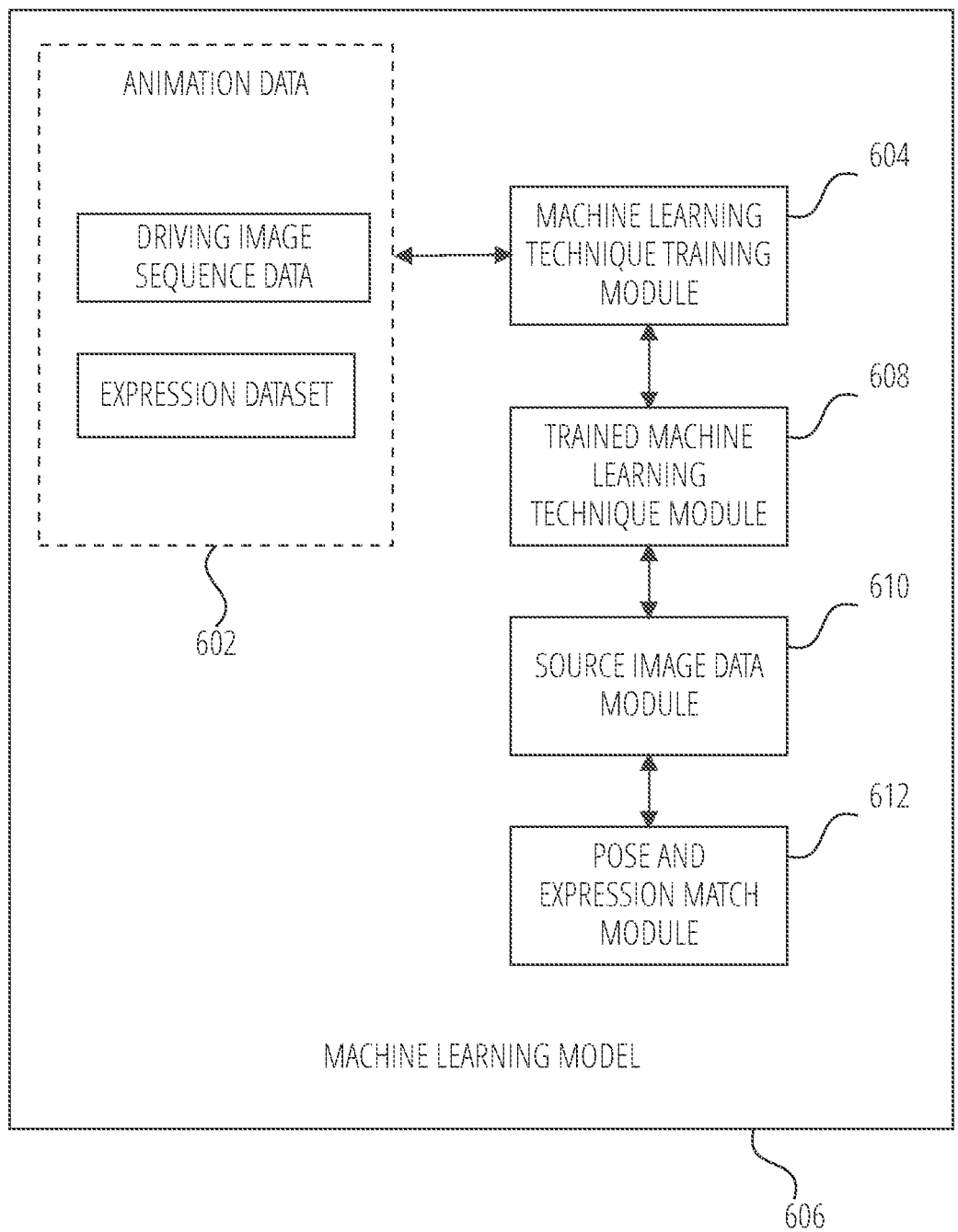
FIG. 6 is a diagrammatic representation of a machine learning model, in accordance with some example embodiments.

FIG. 6 illustrates a machine learning model 606, according to some example embodiments. The machine learning model 606 includes animation data 602, machine learning technique training module 604, a trained machine learning technique module 608, a source image data module 610, and a pose and expression match module 612.

In some implementations, some modules of machine learning model 606 may be implemented on messaging client 104 and others may be implemented on application servers 112 In some implementations, all of the modules of machine learning model 606 are implemented on the messaging client 104 or the application servers 112. In such cases, the messaging client 104 communicates information to application servers 112 based on the modules implemented and vice versa.

The animation data 602 includes driving image sequence data and an expression dataset. The driving image sequence data includes an ordered set of image arrays of a human actor, ordered based on a time stamp associated with each image array. The ordered set of image arrays depicts a head pose of the human actor. Each image array has images of a head pose of the human actor from different viewpoints. The expression matcher system also identifies an expression dataset. The expression dataset is an unordered set of image arrays of a human actor with different facial expressions and head poses. Each image array in the expression dataset contains images of the same facial expression from different viewpoints. The animation data 602 may be generated by using multiple cameras to capture images of the human actor(s) from different viewpoints.

The machine learning technique training module 604 is trained to match the head pose and expression of objects in a driving image sequence to an object in a source image sequence.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., user login attempt features and known challenge response labels) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for predicting a days to pending amount for a given property.

The machine-learning algorithms utilize features for analyzing the data to generate assessments. A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The machine-learning algorithms utilize the training data to find correlations among the identified features that affect the outcome or assessment. In some example embodiments, the training data includes labeled data, which is known data for one or more identified features and one or more outcomes, such as the days to pending amount.

Once the training data are collaged and processed, the machine learning technique training module 604 can be built using machine learning techniques. Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some embodiments, the machine learning technique training module 604 is trained to match the head pose and expression of an object in a driving image sequence to an object in a source image sequence based on one or more features (e.g., training data received from the animation data 602). In some embodiments the facial animation system 700 may train the machine learning technique training module 604 on a periodic basis (e.g., weekly, monthly, annually).

After being trained, the machine learning technique training module 604 is provided to the trained machine learning technique module 608. The trained machine learning technique module 608 is configured to receive a source image sequence depicting a head and a face from the source image data module 610. For example, the source image data module 610 receives a source image sequence generated by the client device. The source image data module 610 instructs the trained machine learning technique module 608 to apply the trained machine learning technique to the source image sequence provided by the source image data module 610.

The trained machine learning technique module 608, for each source image in the source image sequence provided by the source image data module 610, identifies a driving image from the animation data 602 based on the driving image having a similar head pose to the source image and identifies an expression image from the animation data 602 based on the expression image having a similar expression and head pose as depicted in the source image. The trained machine learning technique module 608 provides the identified driving image and identified expression image for each corresponding source image to the pose and expression match module 612. The pose and expression match module 612 modifies the corresponding source image in the source image sequence by using motion estimation differences between the identified driving image and identified expression image.

Figure 7:
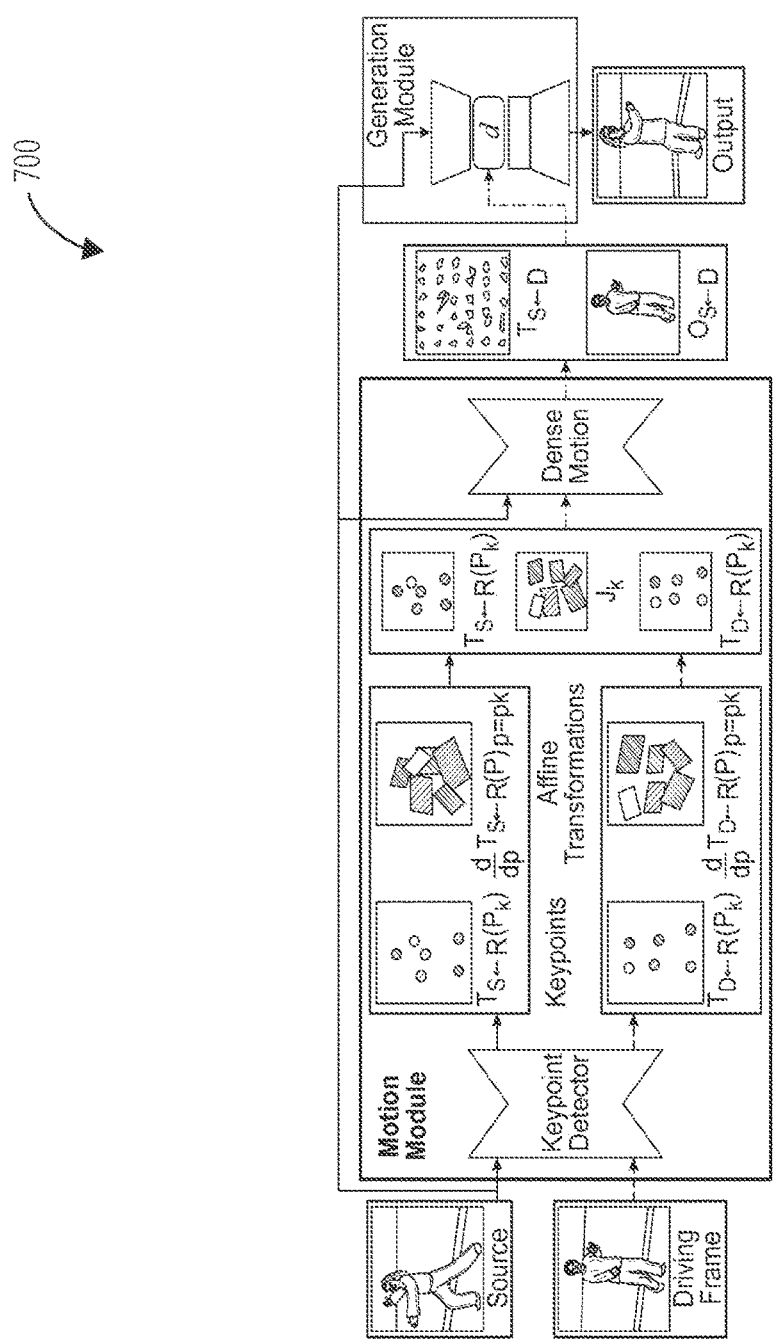
FIG. 7 illustrates a facial animation system, in accordance with some example embodiments.

FIG. 7 is a diagrammatic representation of a facial animation system 700, according to some example embodiments. The facial animation system 700 may be a machine learning model 606. The facial animation system 700 is used to animate an object depicted in a source image sequence based on the motion of a similar object in a driving video.

For training, the facial animation system 700 employs a large collection of video sequences containing objects of the same object category. The facial animation system 700 is trained to reconstruct training videos by combining a single frame and a learned latent representation of the motion in the video. Observing frame pairs, each extracted from the same video, the facial animation system 700 learns to encode motion as a combination of motion-specific key point displacements and local affine transformations. The facial animation system 700 is applied to pairs composed of the target image and of each frame of the driving video and performs image animations of the object in the target image.

The facial animation system 700 is composed of two main modules: a motion estimation module and an image generation module. In some examples the motion estimation module contains two neural networks: a keypoint detector neural network and a dense motion neural network. For example, the keypoint detector neural network and the dense motion neural network may be convolutional neural networks. In some examples, the image generation module contains an image generation neural network.

The purpose of the motion estimation module is to predict a dense motion field from a frame of the driving video, $D \in R^{3 \times H \times W}$ of dimension H×W (e.g., driving image sequence data) to the source frame, $S \in R^{3 \times H \times W}$ (e.g., source image sequence). The dense motion field is later used to align the feature maps computed from the source frame, S with the object pose in the frame of the driving video, D. The dense motion field is modeled by a function, $T_{S \leftarrow D}: R^2 \rightarrow R^2$, that maps each pixel location in D with its corresponding location in S. $T_{S \leftarrow D}$ is referred to as backward optical flow. The facial animation system 700 employs backward optical flow, since back-warping can be implemented in a differentiable manner using bilinear sampling.

In some examples, facial animation system 700 assumes an abstract reference frame, R and independently estimate two transformations: from R to S ($T_{S \leftarrow R}$) and from R to D ($T_{D \leftarrow R}$). In the first step, the facial animation system 700 approximates both transformations from sets of sparse trajectories, obtained by using keypoints learned in a self-supervised way. The locations of the keypoints in D and S are separately precited by an encoder-decoder network. The keypoint representation acts as a bottleneck resulting in a compact motion representation.

In some examples, the facial animation system 700 models motion in the neighborhood of each keypoint using local affine transformations. Compared to using keypoint displacements only, the local affine transformations allow the facial animation system 700 to model a larger family of transformations. The facial animation system 700 further uses a Taylor expansion to represent the transformation from R to D ($T_{D \leftarrow R}$) by a set of keypoint locations and affine transformations. Therefore, the keypoint detector networks outputs keypoint locations as well as the parameters of each affine transformation.

The facial animation system 700 obtains a resulting dense motion field, $\hat{T}_{S \leftarrow D}$, using a dense motion neural network to combine the local approximation. In addition to the dense motion field, the dense motion neural network outputs an occlusion mask that indicates which image parts of D can be reconstructed by warping of the source image and which parts should be inpainted (e.g., inferred from the context). For example, inpainting includes conserving damaged, deteriorated, or missing parts of an image.

The image generation module renders an image of the source object moving as provided in the driving video. The facial animation system 700 uses the image generation neural network G that warps the source image according the resulting dense motion field and inpaints the image parts that are occluded in the source image.

Fully unsupervised methods provide tools for performing realistic motion transfer. Thus, in some embodiments, in order to improve head pose matching and facial expression matching, the facial animation system 700 uses combined supervised and self-supervised landmarks in the framework. More specifically, the facial animation system 700 supervises for keypoints: two for centers of the eye and two for mouth corners, leaving identification of the six remaining keypoints to the network.

In some examples, the keypoint detector neural network is deployed on a mobile device. For example, the facial animation system 700 must significantly decrease the size of the keypoint detector neural network and train the smaller size keypoint detector neural network to produce reasonable results. In this case, the facial animation system 700 adds additional distillation loss to the keypoint detector neural network output. More specifically, for the keypoints $\{g_t\}$, t=1 ... K predicted by a smaller sized keypoint detector neural network and keypoints $\{G_t\}$, t=1 ... K precited by the original larger keypoint detector neural network, the facial animation system 700 adds additional distillation loss which can be computed by:

$$L_{kp\_distillaiton} = \sum_{t=1}^{K}(g_t - G_t)^2$$

In some embodiments, the facial animation system 700 augments the training video dataset with synthetic image pairs. In some examples, the synthetic image pairs are generated using image-to-image translation methods. For example, the facial animation system 700 trains an image-to-image neural network (e.g., an image2image neural network) that generates a smiling face image, where teeth are visible, from images of faces that have a neutral expression, where teeth are not visible. This neural network can be used to generate a large dataset of {neutral, smiling} pairs. Each pair can be considered as a synthetic video consisting of two frames. Additionally, since regions with teeth constitute a small portion of a frame, the reconstruction error is rather small. However, for human perception, this region is important and small visual artifacts in this region are easily noticed. Thus, the facial animation system 700 increases the weight for reconstruction loss in this specific region.

For example, assume that D is a ground truth frame and $\hat{D}$ is a generated frame. A teeth mask M can be represented by:

$$M[p] = \begin{cases} \lambda, & \text{if } p \text{ is a teeth pixel} \\ 1, & \text{otherwise} \end{cases}$$

where $\lambda > 1$ is a weight for a teeth region, and p is a coordinate of a specific pixel. Given this, the facial animation system 700 formulates the re-weighted reconstruction loss as follows:

$$L(D, \hat{D}) = \sum_{k=1}^{K} M\|N_k(D) - N_k(\hat{D})\|$$

where $N_k$ is k-th part of the perceptual loss, and M is properly downscaled.

In some embodiments, the facial animation system 700 adds Adaptive Instance Normalization (AdaIN) which is applied by a mask. The facial animation system 700 trains an additional teeth encoder jointly with the rest of the pipeline. For example, the teeth encoder takes a cropped and resized image of the teeth and produces a style vector for it. The facial animation system 700 adds AdaIN blocks on each resolution of the generator's decoder and modifies the upsampling blocks (e.g., upsampling being a method to train an unbalanced dataset, including the process of randomly duplicating observations from the minority class in order to reinforce its signal to make the dataset balanced), such that instead of predicting only features, they also predict a 1-channel mask. This mask specifies the area where the predicted masks, $\gamma_{(h,w)}$ and $\beta_{(h,w)}$ are applied to features in the corresponding AdaIN block. Since AdaIN blocks should only affect the mouth area, the mask allows features outside the mouth region to remain unchanged. For example, the predicted masks are computed by:

$$\gamma_{(h,w)} = 1 - m_{(h,w)} + m_{(h,w)} * \gamma_{(h,w)}$$

$$\beta_{(h,w)} = m_{(h,w)} * \beta_{(h,w)}$$

Figure 8:
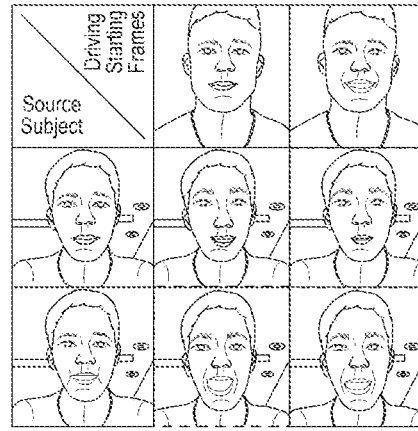
FIG. 8 is an illustration of resultant head pose matching and facial expression matching, in accordance with some example embodiments.
Figure 8:
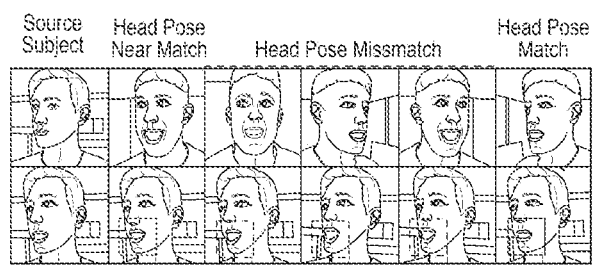

FIG. 8 is an illustration of resultant head pose matching and facial expression matching by the facial animation system 700, according to some example embodiments.

Head pose matching is essential to achieve realistic results when the initial head pose $p_s = \{yaw, tilt, roll\}$ of the source image S and of the head pose $p_D = \{yaw, tilt, roll\}$ of the driving sequence $\{D_t\}$ do not match. Assuming that the driving sequence is observed from multiple, synchronized viewpoints $\{D_t^0, D_t^1, \ldots, D_t^l\}$ where the superscript 1 denotes, the viewpoint the facial animation system 700 performs matching as follows:

$$v^* = \arg\min_{v}\|p_S - p_D^v\|, v = 1 \ldots l,$$

where v is the viewpoint with the head pose $p_D^v$ closest to the source head pose $p_s$ in $L_2$ sense. When processing a view of source frames {St} we apply the equation above at each frame t. With this method, the driving and the source are always spatially aligned (e.g., they have similar poses, rendering more realistic results).

Similarly to head pose matching, the facial animation system 700 performs facial expression matching. The facial animation system 700 defines the facial expression for the source image as $e_s$. Additionally, the facial animation system 700 records a set of facial expressions of the actor in the driving sequence denoting them as $e_D^k = 1 \ldots N$, where N is the total number of frames in the expression video. The facial animation system 700 aims to find the closest facial expression in the expression matcher sequence to the source frame:

$$k^* = \arg\min_{k}\|e_S - e_D^k\|, k = 1 \ldots N,$$

where k* is the sought frame number. If a source video is given, the facial animation system 700 finds the most suitable pair of {v*, t*} for each frame and uses the corresponding driving sequence for animation.

Figure 9:
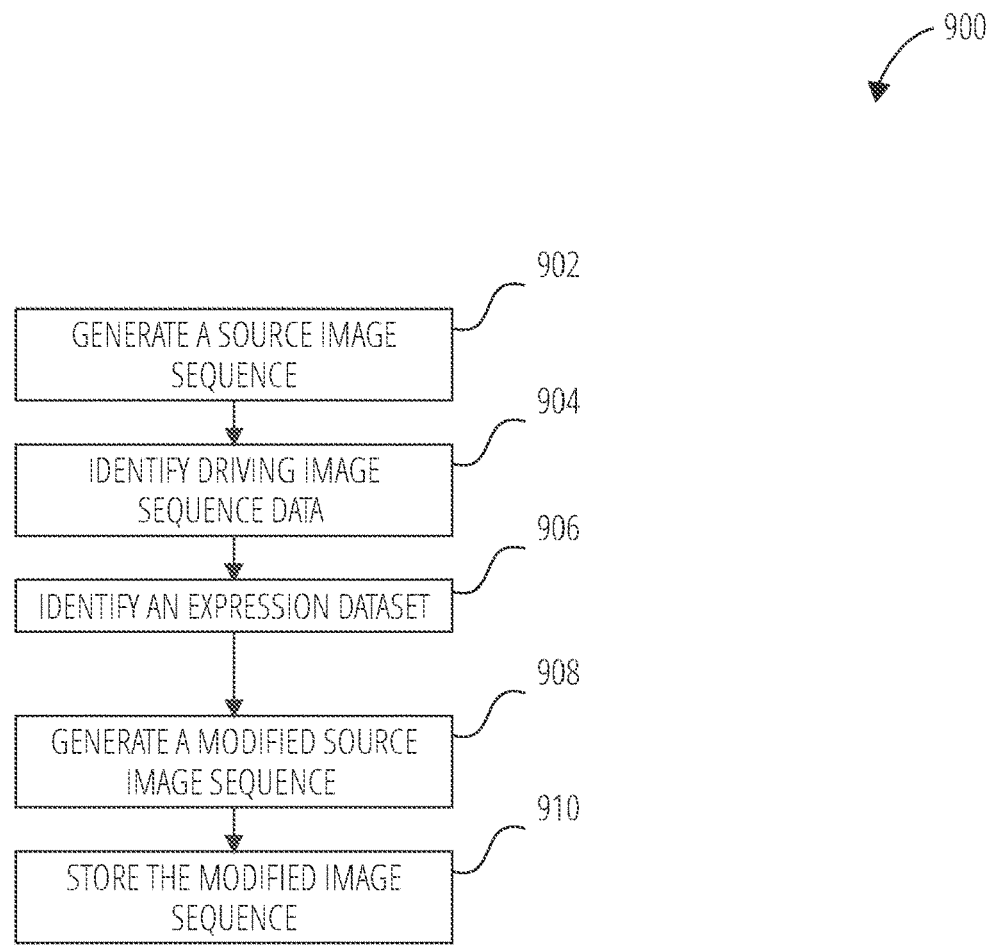
FIG. 9 is a flowchart of an example method for head pose and expression matching, in accordance with some example embodiments.

FIG. 9 is a flowchart is an example method 900 for head pose and facial expression matching, according to some example embodiments. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

At operation 902 the facial animation system 700 generates a source image sequence using an image sensor of the computing device. For example, the source image sequence comprises a plurality of source images depicting a head and a face.

At operation 904, the facial animation system 700 identifies driving image sequence data to modify face image feature data in the source image sequence. The driving image sequence data may be accessed from a database 120. The driving image sequence data comprises an ordered set of image arrays of a head model (e.g., a human actor) depicted from different viewpoints. The set of images are ordered based on time stamps associated with each image in the set of images. Each image array in the ordered set contains images of the head model from different viewpoints.

At operation 906, the facial animation system 700 identifies an expression dataset to modify face image feature data in the source image sequence. The expression dataset comprises an unordered set of image arrays that depict a face (e.g., a human actor) with different facial expressions. Each image array in the unordered set contains images of the same facial expression from different viewpoints.

At operation 908, the facial animation system 700 generates a modified source image sequence depicting modified versions of the head and face. For example, the facial animation system 700 uses an image transformation neural network to generate the modified source image sequence. The image transformation neural network is trained to identify, for each image in the source image sequence, a driving image from the driving image sequence data and an expression image from the expression dataset. The driving image is identified based on the driving image having a similar head pose image to the image in the source image sequence. The expression image is identified based on the expression image having a similar head pose and a similar expression to the image in the source image sequence. The image transformation neural network modifies a corresponding source image in the source image sequence by computing motion estimation differences between the identified driving image and the identified expression image.

In some embodiments, a first viewpoints of the identified driving image coincides with a second viewpoint of the identified expression image (e.g., the head pose in the identified driving image matches the head pose in the identified expression image).

As described above, the image transformation neural network is a framework comprising three neural networks: a keypoint detector neural network, a dense motion neural network and a generation neural network that are trained end-to-end.

The keypoint detector neural network and the dense motion neural network are configured to generate motion estimations differences between the identified driving image and the identified expression image. The generated motion estimation differences are output in the image generation neural network. The image generation neural network is configured to generate each modified source image in the modified source image sequence by applying the motion estimation differences to a corresponding image in the source image sequence.

At operation 910, the facial animation system 700 stores the modified source image sequence on the computing device. In some examples, the modified source image sequence is displayed on a graphical user interface of the computing device (e.g., client device 102). In some examples, the modified source image sequence may be transmitted to a second computing device via the messaging client 104. For example, the modified source image sequence may be transmitted as an ephemeral message 502 to a second computing device via the messaging client 104.

Machine Architecture

Figure 10:
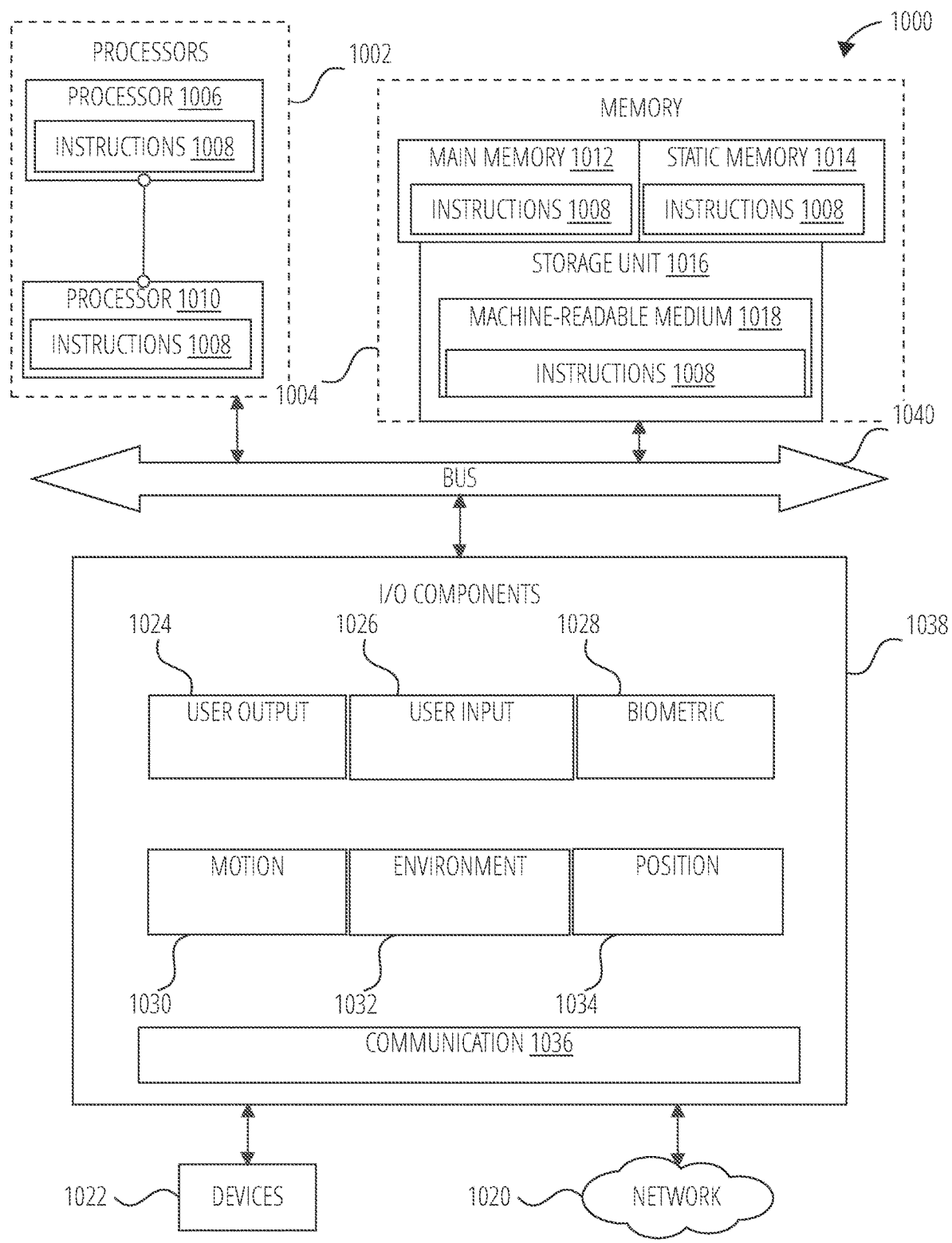
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output I/O components 638, which may be configured to communicate with each other via a bus 1040.

In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1040. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface Component or another suitable device to interface with the network 1020. In further examples, the communication components 1036 may include wired communication components, wireless communication components, cellular communication components, Near Field Communication (NFC) components, Bluetooth© components (e.g., Bluetooth© Low Energy), Wi-Fi© components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
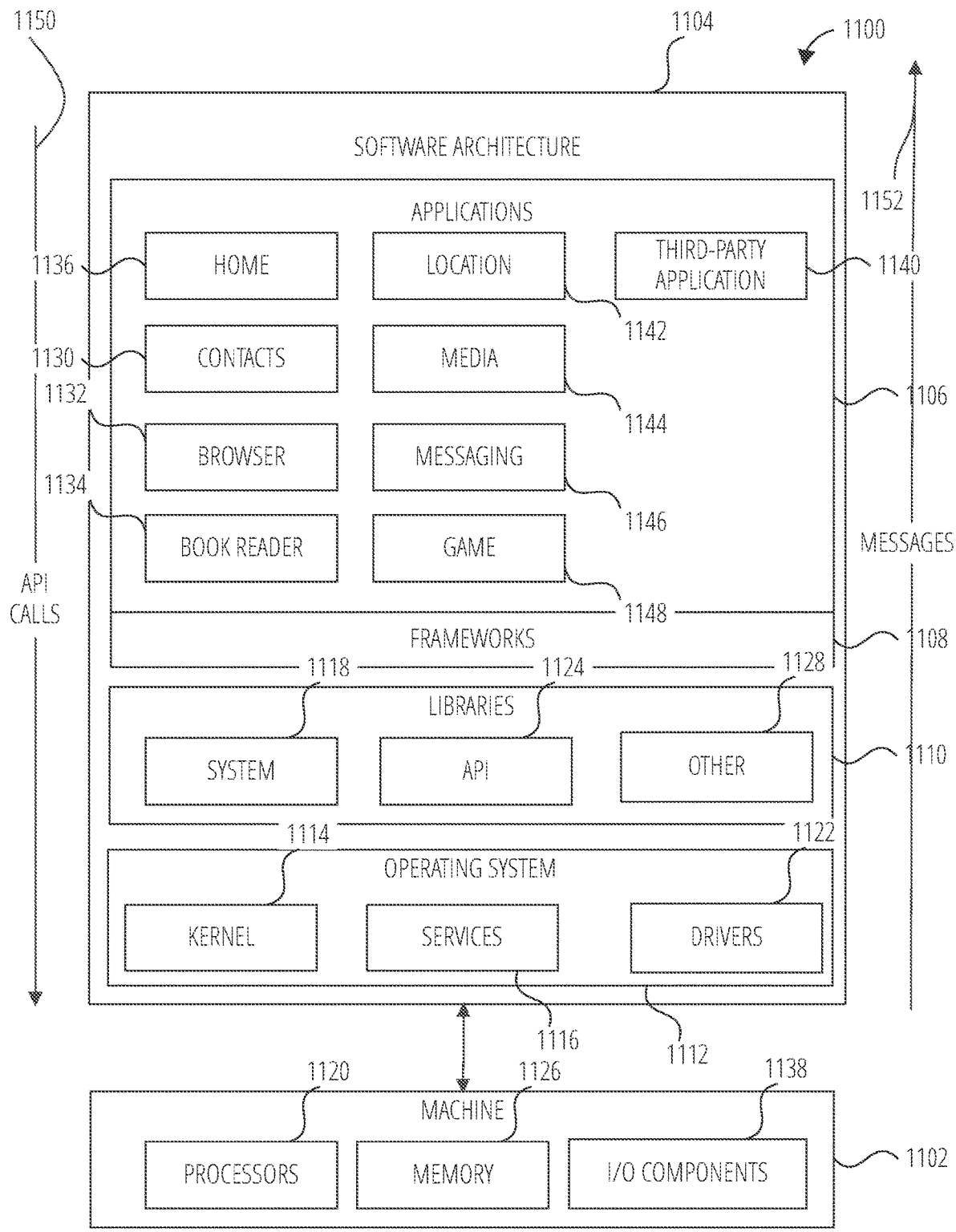
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   generating, by a computing device, a source image sequence using an image sensor of the computing device, the source image sequence comprising a plurality of source images depicting a source head and source face;
   identifying driving image sequence data to modify face image feature data in the source image sequence, the driving image sequence data comprising an ordered set of image arrays that depicts a head in different head poses;
   identifying an expression dataset to modify face image feature data in the source image sequence, the expression dataset comprising an unordered set of image arrays that depicts the head in different head poses and a face in different expressions;
   generating, using an image transformation neural network, a modified source image sequence comprising a plurality of modified source images depicting modified versions of the source head and source face based on the driving image sequence and the expression dataset; and
   storing the modified source image sequence on the computing device.

2. The method of claim 1, wherein each image array in the ordered set of image arrays depicts the head in a same pose from different viewpoints.

3. The method of claim 1, wherein each image array in the unordered set of image arrays depicts the face in a same expression from different viewpoints.

4. The method of claim 1, wherein the image transformation neural network comprises a keypoint detector neural network, a dense motion neural network and a generation neural network.

5. The method of claim 4, wherein the keypoint detector neural network is trained to identify a first set of keypoints for centers of a pair of eyes and a second set of keypoints for mouth corners.

6. The method of claim 1, wherein the image transformation neural network is trained to identify, for each image in the source image sequence, a driving image from the driving image sequence data based on the driving image having a similar head pose to the image in the source image sequence and an expression image from the expression dataset having a similar head pose and a similar expression to the image in the source image sequence, the identified driving image and the identified expression image being implemented by the image transformation neural network to modify a corresponding source image in the source image sequence using motion estimation differences between the identified driving image and the identified expression image.

7. The method of claim 6, wherein the image transformation neural network is configured to generate motion estimations differences between the identified driving image and the identified expression image.

8. The method of claim 6, wherein a first viewpoint of the identified driving image coincides with a second viewpoints of the identified expression image.

9. A computing system, the computing system comprising:
   one or more processors; and
   a memory storing instructions that, when executed by the one or more processors, cause the one or more processors to perform operations comprising:
   generating, by a computing device, a source image sequence using an image sensor of the computing device, the source image sequence comprising a plurality of source images depicting a source head and source face;

identifying driving image sequence data to modify face image feature data in the source image sequence, the driving image sequence data comprising an ordered set of image arrays that depicts a head in different head poses;

identifying an expression dataset to modify face image feature data in the source image sequence, the expression dataset comprising an unordered set of image arrays that depicts the head in different head poses and a face in different expressions;

generating, using an image transformation neural network, a modified source image sequence comprising a plurality of modified source images depicting modified versions of the source head and source face based on the driving image sequence and the expression dataset; and storing the modified source image sequence on the computing device.

10. The computing system of claim 9, wherein the modified source image sequence is transmitted as an ephemeral message to a second computing device.

11. The computing system of claim 9, wherein the instructions further configure the system to:

cause display of the modified source image sequence on a graphical user interface of the computing device.

12. The computing system of claim 9, wherein the image transformation neural network comprises a keypoint detector neural network, a dense motion neural network and a generation neural network.

13. The computing system of claim 12, wherein the keypoint detector neural network is trained to identify a first set of keypoints for centers of a pair of eyes and a second set of keypoints for mouth corners.

14. The computing system of claim 9, wherein the image transformation neural network is trained to identify, for each image in the source image sequence, a driving image from the driving image sequence data based on the driving image having a similar head pose to the image in the source image sequence and an expression image from the expression dataset having a similar head pose and a similar expression to the image in the source image sequence, the identified driving image and the identified expression image being implemented by the image transformation neural network to modify a corresponding source image in the source image sequence using motion estimation differences between the identified driving image and the identified expression image.

15. The computing system of claim 14, wherein the image transformation neural is configured to generate the motion estimations differences between the identified driving image and the identified expression image.

16. The computing system of claim 14, wherein a first viewpoint of the identified driving image coincides with a second viewpoints of the identified expression image.

17. A non-transitory computer-readable storage medium storing instructions that when executed by one or more processors of a machine, cause the computer-readable storage medium to perform operations comprising:

generating, by a computing device, a source image sequence using an image sensor of the computing device, the source image sequence comprising a plurality of source images depicting a source head and source face;

identifying driving image sequence data to modify face image feature data in the source image sequence, the driving image sequence data comprising an ordered set of image arrays that depicts a head in different head poses;

identifying an expression dataset to modify face image feature data in the source image sequence, the expression dataset comprising an unordered set of image arrays that depicts the head in different head poses and a face in different expressions;

generating, using an image transformation neural network, a modified source image sequence comprising a plurality of modified source images depicting modified versions of the source head and source face based on the driving image sequence and the expression dataset; and storing the modified source image sequence on the computing device.

18. The computer-readable storage medium of claim 17, wherein the modified source image sequence is transmitted as an ephemeral message to a second computing device.

19. The computer-readable storage medium of claim 17, wherein the instructions further configure the computer to:

cause display of the modified source image sequence on a graphical user interface of the computing device.

20. The computer-readable storage medium of claim 17, wherein the image transformation neural network comprises a keypoint detector neural network, a dense motion neural network and a generation neural network.

* * * * *